Patented Mar. 20, 1934

1,951,691

UNITED STATES PATENT OFFICE 1,951,691

MANUFACTURE OF POROUS PLASTER

Thomas Coxon, Norton-on-Tees, England, assignor to Imperial Chemical Industries Limited, a corporation of Great Britain No Drawing. Application May 17, 1933, Serial No. 671,594. In Great Britain May 24, 1932

6 Claims. (Cl. 106—34)

This invention relates to the manufacture of porous plaster, i. e. plaster having a void or cellular structure obtained by generating gas within the plastic before or during setting. In this art the gas is usually generated by adding to the mix or to the wet plastic a small amount of an acid or acid reacting substance, and also a substance, e. g. a carbonate, adapted to react therewith in the presence of water to yield a gas. The gas may also be generated by adding alkalies instead of acids, in conjunction with finely divided zinc or aluminium.

With plasters which set sharply within a relatively short time, such as plaster of Paris, it is easy to arrange that the evolution of gas within the plaster shall continue until the mass sets, so that a uniformly porous mass is obtained. With plasters of longer setting time, however, such as anhydrite plasters, difficulties occur because gas evolution may cease before the mass has set, so that the gas bubbles have still an opportunity to escape and consequently a highly porous mass is not obtained. On the other hand, if an attempt is made to overcome this difficulty by employing larger proportions of gas-producing agents the evolution of gas may be too rapid so that the plastic mass expands beyond its strength and ultimately the cellular structure collapses, so that a uniformly porous mass is not obtained.

According to the present invention, this difficulty is overcome by adding to the plaster mix, which consists essentially of finely divided mineral anhydrite containing small proportions of suitable accelerators such as potassium sulphate and/or zinc sulphate, a small amount of Portland cement. The Portland cement appears to impart a preliminary stiffening to the cellular structure until such time as the setting of the plaster begins. The quantity of Portland cement added may be about 0.75 to 1.5 per cent by weight of the dry mixture and, in general, amounts of the order of 1 per cent are sufficient for the purpose of the invention. Larger amounts may be added but it is not advisable to add more than 5 per cent. In preparing a porous plaster in which the gas generating agent consists of an acid or acid salt, it is of course necessary to regulate the amount of Portland cement added so that the bases liberated are not sufficient to neutralize the acid required for gas production. By the use of Portland cement a highly porous structure is maintained in the plaster even when the setting is comparatively slow.

The invention can be applied both to the manufacture of pre-formed objects, such as building blocks, and to the preparation of plastics suitable for application in a wet state and setting in situ.

For instance, in the application of the invention to the manufacture of cast void blocks the following mix was made up:

|  | Pounds |
| --- | --- |
| Anhydrite | 650 |
| Aluminium sulphate | 28 |
| Portland cement | 9 |
| Potassium sulphate | 6 |
| Chalk | 3 |

The mix was gauged with 235 pounds of water and mixed for about two minutes, by which time it became substantially homogeneous. The mixture was then poured into a suitable mould, which comprised a number of compartments corresponding to the particular size of block required. If a finished block of about 12 inches height is desired the initial wet mixture should reach about 7 inches in height in the mould. Expansion sets in immediately and at the end of about 5 minutes, when the evolution of gas had practically ceased, the material in the mould had risen to a height of about 13 inches. After 1 hour the plaster was set and the block removed from the mould. The surfaces of the block can be trimmed or finished in any required manner. If the Portland cement is omitted the expanded mixture falls back about 2 or 3 inches when gas evolution ceases so that the mould is not filled and blocks of the required size are not obtained.

The method used for plastering in situ is as follows:—The dry solids in the quantities given above are carefully mixed together beforehand in the factory. On the job where the plaster is to be used it is put into a suitable mixer and mixed with 250 pounds of water. The mixing is carried on for 2 minutes until the mass is homogeneous, when it is poured into the space or mould which it is required to fill. It will be understood that this mould may take different forms according to the work in progress. For example, in the construction of a composite floor the mould would take the form of shuttering erected specially for the purpose. In the case of filling a cavity wall, the mould would, of course, be the space between the two halves of the wall. The process, however, is similar in all cases, the fluid mixture described above being poured out and allowed to expand. The volume after expansion will be approximately twice that before expansion.

It will be understood that by varying the total amount of gas-producing agent (aluminium sulphate and chalk in the above example) various degrees of porosity may be obtained in the final plaster. For some purposes, where the material has to withstand pressure, for example in the case of building blocks, a moderate expansion of about 100 per cent. on the volume of the initial wet mix is suitable, while greater expansions, e. g. 200-300 per cent. are permissible in other cases where the material is merely used as a filling and is not required to support any weight.

It will also be understood that the natural carbonate content of the mineral anhydrite should be taken into account in estimating the proportion of aluminium sulphate or other acid component added for the purpose of the gas-producing reaction. In some cases the mineral anhydrite may contain sufficient carbonate to render a special addition of the same unnecessary. If excess of aluminium sulphate is used, this will function as an accelerator for the setting of the anhydrite, thus enabling additional accelerators to be dispensed with. I prefer, however, to employ an additional neutral accelerator such as potassium sulphate or zinc sulphate as more uniform results are obtained and the setting is not subject to unforeseen variations due to variations in the natural carbonate content of the anhydrite.

The mixes employed according to the present invention may include pigments and/or filling materials such as sand, pumice, cork, clinker, brick dust or fibrous materials. Other materials may also be added without departing from the spirit of the invention, according to which the essential materials of the mix are mineral anhydrite, accelerators, gas-producing agents and Portland cement.

By the term "Portland cement" as used in this specification and in the appended claims, I mean a composition of matter having hydraulic setting properties and consisting essentially of lime silica and alumina in chemical combination.

The above description and specific examples are illustrative only, and any modifications thereof or derivations therefrom which conform to the spirit of the invention are included within the scope of the following claims.

I claim:—

1. A plaster mix capable of setting with a void or cellular structure, comprising finely divided mineral anhydrite containing a small amount of at least one accelerator, small amounts of gas producing ingredients, and a small amount of Portland cement.

2. A plaster mix capable of setting with a void or cellular structure, comprising finely divided mineral anhydrite containing a small amount of a metal sulphate selected from the class consisting of potassium sulphate, zinc sulphate and aluminium sulphate, small amounts of a carbonate and of an acid reacting substance, and a small amount of Portland cement.

3. A plaster mix capable of setting with a void or cellular structure, comprising finely divided mineral anhydrite, containing a small amount of potassium sulphate, small amounts of calcium carbonate and aluminium sulphate, and a small amount of Portland cement.

4. A plaster mix as set forth in claim 3, in which the amount of Portland cement is of the order of 1 per cent. by weight of the dry mix.

5. A plaster mix capable of setting with a void or cellular structure, comprising approximately 650 parts by weight of mineral anhydrite, 28 parts of aluminium sulphate, 9 parts of Portland cement, 6 parts of potassium sulphate, and 3 parts of chalk.

6. A method of producing a set porous anhydrite plaster mass wherein a mix is made up comprising finely divided mineral anhydrite, an accelerator, gas producing reagents and a small amount of Portland cement, the mix is gauged with water, is applied and is allowed to set.

THOMAS COXON.